United States Patent [19]

Griffin

[11] Patent Number: 4,980,547
[45] Date of Patent: Dec. 25, 1990

[54] LIGHT DISTRIBUTION AND DETECTION APPARATUS

[75] Inventor: James L. Griffin, Carpentersville, Ill.

[73] Assignee: Wells-Gardner Electronics Corp., Chicago, Ill.

[21] Appl. No.: 270,403

[22] Filed: Nov. 7, 1988

Related U.S. Application Data

[63] Continuation of Ser. No. 737,379, May 24, 1985, abandoned.

[51] Int. Cl.⁵ .................. G06K 11/06; G01S 17/88
[52] U.S. Cl. ................................ 250/221; 340/712; 341/31
[58] Field of Search .............. 250/221, 234, 235; 356/4, 5, 375; 340/365 P, 712, 556; 341/31

[56] References Cited

U.S. PATENT DOCUMENTS

| 3,893,129 | 7/1975 | Endo et al. | 250/234 |
| 3,992,623 | 11/1976 | Rhyins et al. | 250/235 |
| 4,107,522 | 8/1978 | Walter | 250/221 |
| 4,197,006 | 4/1980 | Maillet | 356/5 |
| 4,239,961 | 12/1980 | Lasar | 250/221 |
| 4,310,836 | 1/1982 | Stanzani | 250/221 |
| 4,358,202 | 11/1982 | Puffer et al. | 250/235 |
| 4,420,261 | 12/1983 | Barlow et al. | 356/375 |
| 4,507,557 | 3/1985 | Tsikos | 250/221 |
| 4,553,842 | 11/1985 | Griffin | 341/31 |
| 4,811,004 | 3/1989 | Person et al. | 250/221 |
| 4,820,050 | 4/1989 | Griffin | 250/221 |

FOREIGN PATENT DOCUMENTS

| 0083395 | 7/1983 | European Pat. Off. |
| 0125068 | 11/1984 | European Pat. Off. |
| 1429289 | 3/1976 | United Kingdom |
| 1575420 | 9/1980 | United Kingdom |

OTHER PUBLICATIONS

Mesures Regulation Automatisme, vol. 46, No. 10, pp. 51, 53, 55 Paris France: "Avec le miroir tournant, le barrage . . . " (10/81).
IBM Technical Disclosure Bulletin, vol. 14, No. 10, pp. 3031, 3032 New York, U.S.: "Scanning-light spot for stylus input to a computer through a tablet".

Primary Examiner—Edward P. Westin
Attorney, Agent, or Firm—McDermott, Will & Emery

[57] ABSTRACT

An improved radiant energy distribution and detection apparatus for use with a device for detecting radiant energy reflected from a target zone includes an emission device for generation and emission of radiant energy, a device for redirecting radiant energy along a predetermined path and a detector device for sensing the presence of radiant energy reflected from the target zone. The emission device is stationary and emits a beam of radiant energy toward the redirecting device, which redirects the radiant energy along a primary beam path. The redirecting device also is configured for permitting a return beam of light from the target area to impinge upon the detector device, which is located therebehind with repect to the direction of travel of the return beam. A masking arrangement is employed for substantially limiting light reaching the detector to light from the return beam. Also a focusing arrangement is employed for the emission device for focusing the emitted light upon the redirecting device relative to the masking arrangement and detector so as to cause detection of the return beam to take place substantially in the same position as the apparent source of the emitted beam.

14 Claims, 1 Drawing Sheet

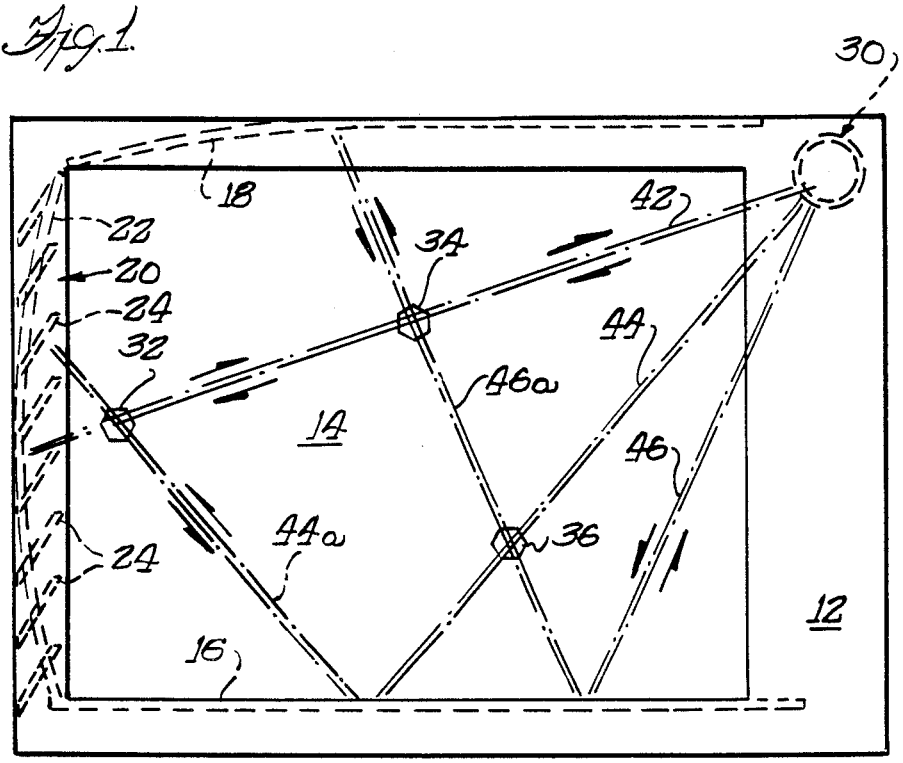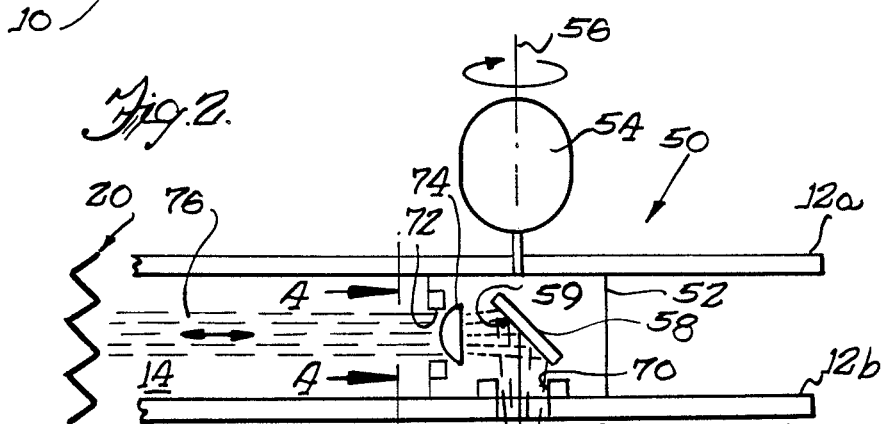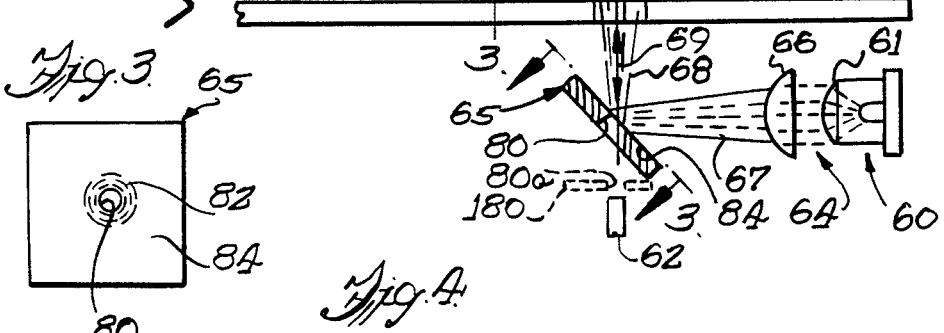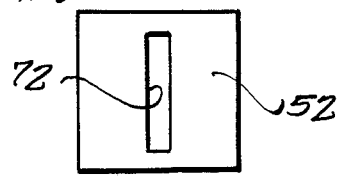

LIGHT DISTRIBUTION AND DETECTION APPARATUS

This is a continuation of application Ser. No. 737,379, filed May 24, 1985, now abandoned.

BACKGROUND OF THE INVENTION

The present invention is directed to an improved radiant energy distribution and detection apparatus for distributing radiant energy about and sensing radiant energy returned or reflected from a target zone, which apparatus is configured to sense the returned or reflected radiant energy substantially at its apparent origin.

While the apparatus of the invention is useful in a broad range of applications, the disclosure will be facilitated by specific reference to use thereof with a device for determining the location of an object within the target zone. (One such device for determining the location of an object within a target zone is disclosed as an "optical touch screen input device" in U.S. Pat. No. 4,553,842, which Patent is assigned to the assignee of the present application.

Two related design problems associated with optically based apparatus or devices are the problems of light losses within the device and the susceptibility of the device to the effects of ambient light present in the operating environment in which the device is employed. Some of the means heretofore employed to decrease susceptibility to ambient light have involved such approaches as filtering of the light employed and installation of baffles or similar devices in the vicinity of the radiant energy detector of the device to interfere with impingement of ambient light upon the detector device. On the other hand, it will be appreciated that the problem of light losses can be aggravated by the installation of additional filtering and baffling devices, each of which will inherently decrease the net radiant energy reaching the detector.

The solutions heretofore employed to these problems generally resulted in additional cost of manufacture of the device and the imposition of additional stringent alignment requirements for various elements of the device to assure proper and accurate operation. Moreover, the scattering of light beams traversing the target zone in some prior art devices often resulted in limiting the resolution of the device.

In our co-pending application, Ser. No. 599,131, filed Apr. 11, 1984, now abandoned, we have proposed an energy distribution and detection apparatus which employs a scanner device configured to both deliver radiant energy to the target zone and to return radiant energy to its point of entry into the target zone after the radiant energy traverses the target zone. The apparatus of our co-pending application uses a radiant energy emission device such as a laser diode which emits a collimated beam of light along a primary beam path in a first direction toward the scanner device or scanning assembly. This scanning assembly sweepingly distributes a discrete beam of radiant energy across the target zone and scans discrete beams of radiant energy returning from that target zone. This apparatus further employs a beam splitter for redirecting radiant energy from the emission device to the scanning assembly and a detector for sensing the presence of radiant energy returning from the scanning assembly.

The beam splitter device is situated within the primary beam path so as to split both the incident beam from the emission device and the incident beam returning from the target zone via the scanning assembly into first and second beam components. The first beam components are substantially continuations of the incident beams in both cases and the second beam components are angularly displaced therefrom. In operation, such a beam splitter device substantially evenly divides the radiant energy contained in the incident beam in each instance between these first and second beam components. Only one of the first and second beam components resulting from the emitted beam is directed to the target zone from the beam splitter. Similarly, the detector device is positioned to receive one of the first and second beam components produced by the beam splitter device in response to the returning beams received from the target zone by way of the scanning assembly. Hence, the detector acts to detect the presence or absence of light for a given orientation of the scanning device relative to the target zone.

It will be appreciated that the above-described use of the beam splitter substantially diminishes the net radiant energy present in the beam incident upon the detector device. That is, the beam splitter effectively halves the net radiant energy both in the beams entering the target zone and in the beams returning from the target zone by way of the scanning assembly. Thus, a maximum of only 25% of the light initially produced by the emission means is available for detection at the detector means. However, the foregoing arrangement greatly enhances resolution by the use of the above-described scanning assembly, as well as by the use of additional structures more fully described in the above-referenced co-pending application Ser. No. 599,131, now abandoned.

OBJECTS AND SUMMARY OF THE INVENTION

Accordingly, it is an object of the present invention to maintain the accuracy rnd resolution of the above-described apparatus and to further enhance operation by positioning the detector substantially coincident with the apparent source or origin of light, while at the same time avoiding the light losses experienced in the above-described apparatus.

It is therefore a general object of the present invention to provide an improved radiant energy distribution and detector apparatus for sensing of radiant energy reflected from a target zone which retains significant sensitivity and resolution in environments having high levels of ambient radiant energy.

A related object is to provide an improved radiant energy distribution and detector apparatus in accordance with the foregoing object which has improved resolution by mitigating scattering and other dissipative characteristics of radiant energy.

A further object of the invention is to provide an improved radiant energy distribution and detection apparatus in accordance with the foregoing objects which is relatively inexpensive to manufacture and yet highly reliable in operation.

Briefly, and in accordance with the foregoing objects, the invention provides an improved radiant energy distribution and detection apparatus for use with a device for detecting radiant energy reflected from a target zone, said apparatus comprising emission means for generation an emission of radiant energy, means for redirecting radiant energy and detector means for sensing the presence of radiant energy; said emission means being stationary and emitting a beam of radiant energy toward said redirecting means to be redirected thereby along a primary beam path in a first direction; said detector means being located along said primary beam path for detecting radiant energy reflected from said target zone back along said primary beam path in a second direction substantially opposite to said first direction; said redirecting means being interposed in said primary beam path between said scanning means and said detector means and being configured for permitting at least a portion of an incident beam travelling in said second direction along said primary beam path to pass therethrough for detection by said detector means; said detector means thereby being positioned along said primary beam path substantially coincident with the apparent origin of said radiant energy delivered to said primary beam path by said redirecting means from said emission means.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of in which like reference numerals identify like elements, and in which:

FIG. 1 is a front elevation, somewhat schematic in form, of a device for determining the location of an object within a target zone, in connection with which an improved radiant energy distribution and detection apparatus in accordance with the invention is advantageously utilized;

FIG. 2 is a side elevation, somewhat schematic in form, of the improved radiant energy distribution and detection apparatus in accordance with a preferred form of the invention;

FIG. 3 is an enlarged view taken generally along the line 3—3 of FIG. 2; and

FIG. 4 is an enlarged view taken generally along the line 4—4 of FIG. 2.

DETAILED DESCRIPTION OF THE ILLUSTRATED EMBODIMENT

Referring to the drawings, and initially to FIG. 1, the apparatus of the invention will be described herein with reference to its use in conjunction with a device for determining the location of an object within a target zone. Such a device is illustrated in FIG. 1, indicated generally by reference numeral 10. The device 10 is intended for use in detecting the presence and position of an object or obstruction such as a finger relative to a surface, and in particular, relative to the surface of the screen of a computer terminal or the like. In general, the touch screen device takes the form of an overlay for creating a light curtain in front of a cathode ray tube or other display screen, such that penetration of this curtain is detectable by the device. Moreover, the penetration by a finger or other object is interpreted to fix the location thereof relative to the screen for a particular application, such as selecting or indicating an item displayed on the screen.

The touch screen or optical position location device 10 includes a generally rectilinear housing 12 which serves to maintain its elements in proper relative positions and to define a generally rectilinear target zone 14 within which the location of objects is to be determined. Disposed within the housing 12 about the target zone 14 are a flat reflector such as a mirror 16, a retroreflector 18 and a retroreflector assembly 20. The latter retroreflector assembly 20 is comprised of a retroreflector strip 22 and a plurality of retroreflector elements 24 arranged in echelon adjacent to the retroreflector strip 22. In one corner of the apparatus 10 is located the improved radiant energy distribution and detection apparatus in accordance with the invention, illustrated schematically at 30.

Referring briefly to the operation of the optical position location apparatus 10, the relative locations of objects or obstructions 32, 34 and 36 can be determined by a triangulation method. In this regard, respective beams of light 42, 44 and 46 are emitted from the apparatus 30. The beam 42 will be seen to intersect both obstructions 32 and 34, while the beam 44 intersects obstruction 36. The beam 46 initially strikes mirror 16 and thereafter is reflected by the mirror as beam 46a at an angle equal and opposite its angle of incidence, to intersect both objects or obstructions 34 and 36. Similarly, beam 44 is also reflected from mirror 16 as beam 44a to intersect obstruction 32.

From the foregoing, it will be seen that each of the obstructions is intersected by two separate beams of light emitted from device 30 at two different angles. Hence, by determining the angle of each of these intersecting beams, the coordinates of the obstruction can readily be determined by conventional triangulation methods. Further in this regard, it will be appreciated that a retroreflector such as retroreflectors 18 and 20 reflect a beam of light directly back upon itself. This phenomena is indicated by the bidirectional arrows illustrated in connection with beams 42, 44a, 46 and 46a. Hence, a detector element included within the apparatus 30 detects each of obstructions 32, 34 and 36 along the paths of at least two separate ones of the beams 42, 44 and 46. The detector determines the locations of the objects by the presence or absence of the return beam of light on each of the paths along which light is directed.

The foregoing optical position location device is more fully described in the above-referenced U.S. Pat. No. 4,553,842 and forms no part of the present invention. Hence, further detailed description thereof is not necessary herein.

Referring now to the remaining figures of drawing, in accordance with the invention, the radiant energy or light distribution and detection apparatus 30 is illustrated in connection with a rotating scanning assembly designated generally by the reference numeral 50 which is most advantageously utilized in connection with the optical position determining apparatus 10. However, the invention is not limited to such a rotating scanning apparatus.

Briefly, this rotating scanning apparatus 50 includes a housing 52 which is mounted for rotation intermediate respective parallel sidewalls 12a and 12b of the frame 12. This housing is rotated by a suitable drive means 54, which may comprise an electrical motor, about a spin axis 56 which is generally perpendicular to the planes of the sidewalls 12a and 12b of the housing. A reflective means such as a mirror 58 is mounted within the housing 52 so that it rotates therewith as the housing rotates in response to the drive means, such that the mirror 58 redirects received beams of energy both to and from the target zone 14. Hence, beams of radiant energy are generally swept across the target zone 14 and likewise, return beams of energy from mirror 16 and retroreflectors 18 and 20 are redirected by the mirror 58 as it sweeps across the target zone 14.

As will be seen presently, the present invention advantageously utilizes the scanning assembly 50 both to distribute radiant energy in the target zone 14 and to collect returned or reflected radiant energy therefrom. Moreover, the rotation of the drive means 54 will be appreciated to be sufficiently slow relative to the speed of light that returning or reflected beams of radiant energy from the target zone are received at the mirror substantially simultaneously with the corresponding beam directed thereby into the target zone. This phenomena is also indicated generally by the doubled beams of light 42, 44 and 46 and bidirectional arrows associated therewith in the illustration of FIG. 1.

In accordance with the invention, a light emission means, indicated generally by reference numeral 60 is provided for introducing radiant energy or light into the housing 58 to be distributed to the target zone 14 as described above. This emission means may comprise an incandescent bulb, but in accordance with the invention, preferably comprises a light emitting diode (LED). In this regard, the light emitting means 60 may also comprise a laser diode if desired. As will be more fully described later, a detector 62 is also provided exteriorally of the housing 52 and comprises a light sensitive means, preferably a phototransistor. In accordance with the preferred form of the invention, the phototransistor 62 is an infrared sensitive phototransistor, and accordingly, LED 60 preferably emits light or radiant energy primarily in the infrared portion of the spectrum. The limiting of light to a given portion of the spectrum in this regard is believed advantageous in limiting the effects of ambient light upon the apparatus of the invention and also upon the position determining device 10.

The beams of light from the LED 60 are preferably first collimated by a lens portion 61 which preferably forms a part of the LED 60, as indicated by the generally parallel lines 64 emanating therefrom. A focusing lens 66 is provided for focusing the beam 64 to a predetermined area on a light redirecting means 65 which will be described in detail hereinbelow. The redirecting means 65 redirects the beams of light as indicated at reference numeral 68 in a first direction along a primary beam path 69, generally in a diverging fashion toward the reflective means or mirror 58 of scanning means or assembly 50.

The housing 52 is provided with a first aperture 70 which is substantially centered on the spin axis 56 and also on the primary beam path 69 to allow entry of the beam 68 of radiant energy into the housing regardless of the rotational orientation thereof. In order to distribute the received beam of radiant energy to the target zone 14, a second aperture 72 in the housing is appropriately situated to allow entry of the beam from the housing to the target zone. This aperture 72 also allows ingress of returning beams of radiant energy from the target zone into the housing and to reflective means or mirror 58 therein Preferably, a collimating lens 74 is provided adjacent the aperture 72 for distributing the beams of radiant energy in a generally parallel or collimated fashion to the target zone, as indicated generally by parallel lines 76. Accordingly, in view of the action of the retroreflectors described above, the return beams will be substantially along the same parallel lines 76. The lens 74 thus also functions to cause the return beams to diverge upon mirror 58 which causes these beams to converge along the primary beam path 69 in the direction of detector 62. In this regard, it will be noted that the detector 62 is also located in alignment with the primary beam path 69.

Accordingly, the beam of radiant energy emerging from the housing 52 through the second aperture 72 sweeps the target zone 14 as the housing is rotated. As mentioned, the rotational speed of the housing is sufficiently slow relative to the speed of the beam of radiant energy or light that the return beam substantially instantaneously re-enters the housing after traversing the target zone. The return beam enters through the second aperture 72 to reflect from the reflective means or mirror 58 and through the first aperture 70 in a second direction opposite the above-described first direction along the primary beam path 69.

In accordance with a preferred form of the invention, the redirecting means comprises a mirror having a through aperture 80 therein As best viewed in FIG. 2, this mirror 65 is disposed for substantially centering this through aperture 80 relative to the primary beam path 69. Moreover, the detector 62 is located closely behind through aperture 80 and also in direct alignment with the primary beam path 69. Accordingly, the return beams from scanning means or assembly 50 travelling in the second or opposite direction along primary beam path 69 tend to be directed through the through aperture 80 to the detector 62. In this regard, the convergence of these return beams due to the action of lens 74 and mirror 58 as previously described tends to cause the beams to converge upon detector 62 through the through the aperture 80.

Most advantageously, the lens 66 is selected and positioned to cause convergence of the emitted beams from the emitting means or LED 60 upon the mirror 68 in a generally annular or ring-like pattern 82 immediately surrounding the aperture 80. Hence, the location at which the bears are detected by detector 62 is substantially coincident with the apparent source of these emitted beams at the surface of the mirror 68. In this regard, and with reference also to FIG. 3, it will be seen that this annular pattern 82 substantially surrounds the aperture 80. Moreover, the mirror 65 will be seen to comprise a substantially flat or planar reflective surface 84 through which the aperture 80 extends and upon which the ring-like or annular pattern 82 of light from the emission means or LED 60 is distributed by the lens 66.

In accordance with a further feature of the illustrated embodiment, an additional means for controlling the depth of field of the return beam introduced to the surface of mirror 58 is provided. In this regard, the aperture 72, as best viewed in FIG. 4, is preferably formed as an elongate, rectilinear aperture This aperture has a relatively narrower dimension in one plane for thereby maximizing the depth of field of focus achieved by lens 74 with respect to the return beams focused upon mirror 58 thereby. However, the other dimension of rectilinear aperture 72 is considerably greater to optimize or maximize the net radiant energy permitted to pass therethrough. Hence, the rectilinear shape of aperture 72 optimizes both the depth of field of focus of the scanning means or assembly 50 as well as the net radiant energy ultimately returned to the detector 62. This feature is believed to further improve the resolution of the apparatus, for example, in detecting the location of an object in the target zone 14.

It will be noted that in the described embodiment, the scanning means or assembly 50 both delivers light to the target area in the form of a scanning beam and simultaneously scans or receives the returned or reflected light beams from the target area. Hence, the resolution of the described embodiment is believed further enhanced by utilizing the scanner for both delivering light to and receiving light from the target area.

Referring to some details of the preferred embodiment, the aperture 80 is preferably circular in form and has a diameter of substantially on the order of 0.020 inches. The reflective means or mirror 58 comprises a substantially flat or planar reflective surface 59 which is disposed for redirecting the beam of radiant energy from the emission means and the return beam from the target zone 14 substantially at a right angle. Similarly, the reflective surface 84 of the mirror 65 is likewise disposed for redirecting the beams from the emission means along the primary beam path, substantially at a right angle. Hence, the emission means or LED 60 is located or disposed to one side of the primary beam path 69.

The apparatus of the invention is not limited to the specific embodiments shown and described herein. For example, the mirror 65 might be replaced by a beam splitter having a planar surface oriented in the same fashion, to thereby deliver about one-half of the light from emitting means or LED 60 to scanner 50. If such a beam splitter were used, the redirecting means would be provided with a mask or cover member 180 shown in phantom line. This mask 180 would have a through aperture 80a substantially similar to through aperture 80 of mirror 65 for permitting substantially only the light focused thereupon from mirror 58 to reach detector 62. The through aperture 80a would of course be aligned with the primary beam path 69 and the spin axis 56 in the same fashion as described above with respect to aperture 80. Moreover, the lens 66 would be identical to that described, focusing light in a generally annular configuration upon the surface of a beam splitter which replaces mirror 68. This annular configuration would be substantially concentrically closely surrounding an area of the beam splitter corresponding to a projection of the through aperture 80a of the mask 180 thereupon. However, the first-described arrangement is preferred, since it avoids the losses inherent in the use of beam splitters as discussed hereinabove. In this regard, it will be appreciated that reflective surface 84 of mirror 65 may also be viewed as such a "mask" having through aperture 80 therein.

Moreover, the apparatus of the invention may be utilized in many applications in addition to and in conjunction with the optical position determining device described herein. In this regard, the invention is equally useful in conjunction with any system for sensing or detecting reflected light beams, or the absence thereof, from a given target zone or region. That is, the invention is similarly useful with any device which is to be located at a single side of or at a single location relative to a target zone or area to be monitored, and in which it is desired for the detector to occupy substantially the same location as the apparent source of radiant energy or light. Such applications include bar code readers, or other optical readers such as for punched tape or the like. Additional applications include reflective type motor speed detectors, burglar alarms, video/audio disc readers and the like.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An optical position location apparatus comprising:
   a housing defining a target zone; and
   means for determining the location of an object in two dimensions within said target zone, said position determining means including
   a reflector disposed within said housing and about said target zone,
   emission means for generating and emitting radiant energy, said emission means being stationary,
   means for redirecting the radiant energy emitted by said emission means along a primary beam path in a first direction,
   scanning means for sweeping said redirected radiant energy travelling in said first direction across said target zone, and for directing radiant energy reflected by said reflector from said target zone in a second direction along said primary beam path and substantially opposite to said first direction, and
   detector means for detecting radiant energy reflected by said reflector from said target zone and directed by said scanning means in said second direction,
   said redirecting means being interposed between said scanning means and said detector means and being configured for permitting at least a portion of said radiant energy reflected from said target zone and travelling in said second direction to pass through said redirecting means for detection by said detector means.

2. An optical position locating apparatus according to claim 1 in which said scanning means further includes a scanner housing and reflective means within said scanner housing, said scanner housing having a first aperture through which said redirected radiant energy travelling in said first direction passes before contacting said reflective means, and a second aperture through which radiant energy travels after contacting said reflective means, said scanning means further including drive means for rotating said scanner housing about a spin axis, said first aperture being substantially centered on said spin axis and said primary beam path, such that said redirected radiant energy travelling in said first direction enters said housing through said first aperture regardless of rotational orientation of said housing, said reflective means being oriented within said scanner housing to reflect said redirected radiant energy travelling in said first direction through said second aperture, said scanner housing being oriented such that radiant energy emerging from said scanner housing through said second aperture sweeps the target zone as said scanner housing is rotated at a rotational speed, said rotational speed being sufficiently slow to permit radiant energy reflected from said target zone to substantially instantaneously re-enter said housing through said second aperture and to reflect from said reflective means through said first aperture.

3. An optical position locating apparatus according to claim 1 in which said redirecting means comprises a redirecting mirror having a substantially planar reflective surface facing away from said detector means, and a through aperture extending through said mirror and being substantially centered with respect to said detector means and said primary beam path.

4. An optical position locating apparatus according to claim 3 wherein said through aperture is substantially circular and has a diameter of on the order of substantially 0.020 inches.

5. An optical position locating apparatus according to claim 2 wherein said reflective means comprises a reflective mirror having a substantially planar reflective surface.

6. An optical position locating apparatus according to claim 1 wherein said emission means comprises means for producing a collimated beam of radiant energy.

7. An optical position locating apparatus according to claim 6 wherein said emission means comprises an LED.

8. An optical position locating apparatus according to claim 6 wherein said emission means comprises a laser diode.

9. An optical position locating apparatus according to claim 3 further including first lens means interposed between said emission means and said redirecting mirror for focusing the beam of radiant energy produced by said emission means upon an area of said redirecting mirror substantially surrounding said through aperture.

10. An optical position locating apparatus according to claim 1 further including means defining a mask interposed between said redirecting means and said detector means, said mask means having an opening therein, said opening being substantially centered with respect to said detector means and said primary beam path, and further including first lens means interposed between said emission means and said redirecting means, said first lens means being disposed for directing said radiant energy emitted by said emission means upon said planar redirecting means in a substantially annular pattern surrounding said through aperture.

11. An optical position locating apparatus according to claim 9 and further including second lens means interposed between said reflective means and said second aperture for collimating said radiant energy reflected from said reflective means and exiting through said second aperture and for focusing said radiant energy reflected from said target zone and received through said second aperture upon said reflective means.

12. An optical position locating apparatus according to claim 11 wherein said second aperture is rectangular in form and has one relatively narrow dimension for optimizing the depth of field of focusing of said second lens means in one plane and a second relatively greater dimension for optimizing the amount of radiant energy allowed to pass through said second lens means.

13. An optical position locating apparatus according to claim 3 wherein said reflective surface of said redirecting mirror is disposed for redirecting the beam of radiant energy from said emission means substantially at a right angle, said emission means being located to one side of said primary beam path.

14. An optical position locating apparatus according to claim 5 wherein said reflective surface of said reflective mirror is disposed for redirecting radiant energy incident thereupon substantially at a right angle.

* * * * *